United States Patent
Keesara et al.

Patent No.: US 10,680,931 B2
Date of Patent: Jun. 9, 2020

(54) INGRESS GATEWAY SELECTION FOR A SHORTEST PATH BRIDGING NETWORK TO SUPPORT INTER DOMAIN MULTICAST ROUTING (71) Applicant: Extreme Networks, Inc., San Jose, CA (US)

(72) Inventors: Srikanth R. Keesara, Tewksbury, MA (US); Julie Alma Carleton, North Andover, MA (US); Vedavinayagam Ganesan, Acton, MA (US)

(73) Assignee: Extreme Networks, Inc., San Jose, CA (US)

( * ) Notice: Subject to any disclaimer, the term of this patent is extended or adjusted under 35 U.S.C. 154(b) by 112 days.

(21) Appl. No.: 15/645,253

(22) Filed: Jul. 10, 2017

(65) Prior Publication Data

US 2019/0014033 A1    Jan. 10, 2019

(51) Int. Cl.
H04L 12/721 (2013.01)
H04L 12/66 (2006.01)
H04L 12/18 (2006.01)
H04L 12/745 (2013.01)
H04L 12/24 (2006.01)
H04L 12/761 (2013.01)
H04L 12/703 (2013.01)
H04L 12/715 (2013.01)

(52) U.S. Cl.
CPC .............. H04L 45/12 (2013.01); H04L 12/18 (2013.01); H04L 12/66 (2013.01); H04L 41/0668 (2013.01); H04L 45/04 (2013.01); H04L 45/16 (2013.01); H04L 45/28 (2013.01); H04L 45/748 (2013.01)

(58) Field of Classification Search
CPC .......... H04L 12/18; H04L 45/12; H04L 45/16
USPC ....................................................... 370/225
See application file for complete search history.

(56) References Cited

U.S. PATENT DOCUMENTS

| | | | |
|---|---|---|---|
| 8,018,953 B1 * | 9/2011 | Zhao ........................ | H04L 45/08 370/238 |
| 2013/0077628 A1 * | 3/2013 | Appalla ................. | H04L 12/462 370/390 |
| 2015/0146603 A1 * | 5/2015 | Wu ......................... | H04L 12/189 370/312 |
| 2015/0222540 A1 * | 8/2015 | Unnimadhavan ....... | H04L 67/10 709/224 |

* cited by examiner

Primary Examiner — Natasha W Cosme
(74) Attorney, Agent, or Firm — Sterne, Kessler, Goldstein & Fox P.L.L.C.

(57) ABSTRACT

In a Shortest Path Bridge (SPB) network comprising a plurality of backbone edge bridges (BEBs), a gateway controller of the SPB network, establishes a link using Multicast Source Discovery Protocol (MSDP) with an external network domain; discovers via the link a source of a multicast stream originating outside of the SPB network; and determines a subset of the plurality of BEBs that are able to receive the multicast stream from the source. Once that occurs, the gateway controller selects a one of the subset of the plurality of BEBs to be a sole gateway BEB for the multicast stream; and then transmits to each of the subset of the plurality of BEBs an indication of the sole gateway BEB selected for the multicast stream.

21 Claims, 7 Drawing Sheets

INGRESS GATEWAY SELECTION FOR A SHORTEST PATH BRIDGING NETWORK TO SUPPORT INTER DOMAIN MULTICAST ROUTING

BACKGROUND

Embodiments of the present disclosure generally relate to multicast traffic in shortest path bridging networks, and, in particular, to supporting interdomain multicast routing.

PIM (Protocol Independent Multicast) can satisfy the need for multicast forwarding inside a single domain or autonomous system, which is not the case with multicast applications intended to provide services outside the boundary of a single autonomous system. For Inter Domain multicast, other protocols such as Multicast Source Discovery Protocol (MSDP) can be used.

With PIM-SM a typical multicast framework inside a single domain is composed of one or more rendezvous points (RPs), multicast sources and multicast receivers. An RP is responsible for registering sources and linking them to receivers. MSDP is designed to make multicast sources available for other domain receivers by communicating this information between RPs in different domains.

Multicast Source Discovery Protocol (MSDP) is a PIM family multicast routing protocol defined by Experimental RFC 3618. MSDP interconnects multiple PIM Sparse-Mode (PIM-SM) domains which enables PIM-SM to have Rendezvous Point (RP) redundancy and inter-domain multicasting (examples are described in RFC 4611).

MSDP typically uses TCP as its transport protocol. Each multicast tree has to have its own RP. All of the RP's are peers (directly or through other MSDP peers). Messages contain a) Source of Data, and b) Group Address The Data Source Sends To; i.e., (S,G). When an RP on its own domain receives a message, it determines if there are group members on this domain interested in a multicast. If someone is interested it triggers a join towards the data source (into the source domain) in the way of (S, G). Typically, in a peering relationship, one MSDP peer listens for new TCP connections on the well-known port 639.

An Inter Domain IP Multicast deployment consists of multiple independently operated multicast networks (domains) being able to exchange multicast traffic from one network to another. In order to provide redundancy these multicast networks are interconnected in a redundant fashion at multiple routers and interfaces.

One of these networks could be a Shortest Path Bridging (SPB) Network. SPB is a transport network protocol that provides logical Ethernet networks on native Ethernet infrastructure using a link state protocol to advertise both topology and logical network membership. Packets are encapsulated at the edge of an SPB network either in mac-in-mac 802.1ah or tagged 802.1Q/802.1ad frames and transported only to other members of the logical network. Unicast and multicast are supported and all routing is on symmetric shortest paths. Many equal cost shortest paths are supported. An SPB Multicast solution should rely on configuring the Ingress BEBs to ensure that any given multicast stream has a single entry point in the SPB Network. Also, MSDP peering to the SPB network should be accomplished in a way that does not go beyond the scaling limits of the multicast routers in the neighboring networks.

BRIEF SUMMARY

One aspect of the present disclosure relates to a method in a Shortest Path Bridge (SPB) network comprising a plurality of backbone edge bridges (BEBs). In particular the method includes establishing, by a gateway controller of the SPB network, a link using Multicast Source Discovery Protocol (MSDP) with an external network domain; discovering, by the gateway controller, via the link a source of a multicast stream originating outside of the SPB network; and determining, by the gateway controller, a subset of the plurality of BEBs that are able to receive the multicast stream from the source. Once that occurs, the method continues with selecting, by the gateway controller, a one of the subset of the plurality of BEBs to be a sole gateway BEB for the multicast stream; and then transmitting, by the gateway controller, to each of the subset of the plurality of BEBs an indication of the sole gateway BEB selected for the multicast stream. The method can also include the gateway controller exporting to the external network domain, information about one or more multicast streams originating from within the SPB network.

In accordance with this aspect, the sole gateway BEB and the gateway controller can be separate devices within the SPB network.

Furthermore, the subset of the plurality of BEBs comprises a first BEB and a second BEB that has a respective associated external route cost to the source; and selecting the sole gateway BEB comprises selecting the first BEB or the second BEB having a lower associated external route cost. Alternatively, each can have a respective associated route prefix match with an IP address of the source; and selecting the sole gateway BEB comprises selecting the first BEB or the second BEB having a longer route prefix match. Still further, each can have a respective hash value that is calculated for each of the first and second BEB based on one or more respective predetermined identifying characteristics; and selecting the sole gateway BEB comprises selecting the first BEB or the second BEB having a lower associated hash value.

In accordance with another aspect, the method can include subsequent to transmitting the indication of the sole gateway BEB selected for the multicast stream, determining a change in an attribute of a route between one of the subset of the plurality of BEBs and the source; selecting, by the gateway controller, a different one of the subset of the plurality of BEBs to be an updated sole gateway BEB for the multicast stream; and then transmitting, by the gateway controller, to each of the subset of the plurality of BEBs an indication of the updated sole gateway BEB selected for the multicast stream. In accordance with this aspect, the change comprises a change in an external cost of the route. Alternatively, the change comprises a link failure along the route.

Another aspect of the present disclosure relates to a gateway controller in a Shortest Path Bridge (SPB) network comprising a plurality of backbone edge bridges (BEBs). The gateway controller in the SPB network includes a memory device storing executable instructions and a processor in communication with the memory device. Executing the executable instructions by the processor causes the processor to: a) establish a link using Multicast Source Discovery Protocol (MSDP) with an external network domain; b) discover via the link a source of a multicast stream originating outside of the SPB network; and c) determine a subset of the plurality of BEBs that are able to receive the multicast stream from the source. Executing the executable instructions also causes the processor to select a one of the subset of the plurality of BEBs to be a sole gateway BEB for the multicast stream; and transmit to each of the subset of the plurality of BEBs an indication of the sole gateway BEB selected for the multicast stream.

Another aspect of the present disclosure relates to a non-transitory computer readable storage medium having computer readable code thereon, the medium including instructions executable by a computer system to perform operations that include establishing a link using Multicast Source Discovery Protocol (MSDP) between a gateway controller of an SPB network and an external network domain; discovering, by the gateway controller, via the link a source of a multicast stream originating outside of the SPB network; and determining, by the gateway controller, a subset of a plurality of BEBs of the SPB network that are able to receive the multicast stream from the source. Once that occurs, the operations include selecting, by the gateway controller, a one of the subset of the plurality of BEBs to be a sole gateway BEB for the multicast stream; and then transmitting, by the gateway controller, to each of the subset of the plurality of BEBs an indication of the sole gateway BEB selected for the multicast stream.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

An Inter Domain deployment of IP Multicast seeks to deliver IP Multicast traffic across multiple independently operated networks. The operators of one domain cannot make any assumptions about how the other domains handle multicast routing internally. Each of these independent networks constitutes a separate domain and could be using totally different multicast protocols internally compared to any other domain. The key elements of an architecture that supports an Inter Domain IP Multicast deployment are:

Stream Discovery: The routers in one domain need to know about the sources for multicast streams that exist in the other domains. This is accomplished by running MSDP between multicast routers in one domain with multicast routers in the other domains.

Boundary Signaling: Boundary routers, in a domain which has receivers for a stream, request delivery of multicast traffic for the stream from the boundary routers in the domain which has the sources for the multicast stream. The protocol used for this signaling at the boundary is PIM.

Intra Domain Signaling: Protocol mechanisms that are required to deliver the stream from the Boundary router to the receiver in the destination domain. These are internal to the domain and depend on the multicast technology used within the domain. PIM and SPB examples are different technologies that can be used to route multicast traffic within a domain.

Details about an example inter domain multicast environment are provided in U.S. Pat. No. 8,804,722, assigned to Avaya Inc., the contents of which are hereby incorporated by reference in their entirety.

Embodiments in accordance with the principles of the present disclosure relate to advantageous ways of a) selecting a unique entry-point into the SPB Network for any given stream and b) running MSDP sessions from the SPB Network. In particular a solution is described for how to uniquely select a gateway BEB from multiple possible redundant gateways for each non-domain multicast stream and how to minimize the number of MSDP sessions. A gateway BEB and a gateway controller (GC) are used in implementing embodiments of the present disclosure.

A gateway controller (GC) is any node in the SPB Network that performs the following functions:

1. Responsible for MSDP peering with the Multicast Routers in the other domains for the purpose of exchanging multicast stream information. It exports {(S,G)} information for multicast streams originating in the SPB Network to the multicast routers in the other domains. It also imports {(S, G)} information about multicast streams that originate in the other domains.

2. Applies policy to control the stream information that is allowed to be exported or imported.

3. Performs an in-network discovery of all the gateway BEBs.

4. For each multicast stream that is learnt from the other Domains—it selects a one of the Gateway BEB as the entry-point for that stream into the SPB Network. The set {(Out of Domain Stream, Selected Gateway for the Out of Domain Stream)} is referred to here as the Gateway Assignment Table.

5. Distributes the Gateway Assignment Table to all the gateway BEBs within the SPB Network.

A gateway BEB is a BEB at the boundary of the SPB Domain and another Multicast Domain (which could be a PIM network or potentially another SPB Network). It performs the following functions:

1. It establishes PIM adjacencies with multicast routers in the neighboring multicast networks.

2. Receives updates to the Gateway Assignment table from the gateway controller.

3. For the streams for which it is the selected gateway—it advertises them into the SPB Network using the normal Ingress BEB signaling used for SPB Multicast (This allows the rest of the network to use normal SPB Multicast procedures to request these streams).

4. Streams for which it was the selected gateway in the previous Gateway Assignment Table, but is no longer the Gateway—it withdraws advertisements from the SPB Network.

5. Uses PIM signaling to request the non-domain streams from the SPB Network and also to deliver SPB streams to the neighboring multicast domains.

As described in more detail below, just one gateway controller in the SPB Network can be present, though additional controllers may be deployed to support redundancy. Also, gateways and the gateways controller(s) use an I-SID to discover and exchange control plane information with one another in a multi-point to multi-point fashion.

Embodiments of the present disclosure provide for centralized discovery and gateway selection for foreign multicast streams in an Inter Domain multicast deployment as an alternative to a more traditional approach which would have been for all the gateway BEBs to establish MSDP sessions with the multicast routers in the other Domains. The gateway BEBs would then have to use some kind of distributed algorithm to ensure that each SPB stream is exported by only a single gateway to the multicast routers in the other domain. Using these MSDP sessions, each of the gateway BEBs would learn about all the multicast streams in the other domains and then they would have to use some kind of distributed algorithm to ensure one and only one gateway BEB will select itself as the entry point for any given non-domain multicast stream. One potential problem of this type of approach is how to select a gateway BEB in a distributed manner while ensuring there are no transitional loops.

Embodiments of the present disclosure, however, offer some distinct advantages over the traditional approach described above. The number of MSDP session scaling expectations on the multicast routers in the neighboring networks can be lowered since a single gateway controller can represent the entire SPB Network for the purpose of MSDP peering. Also, there is no need for any kind of distributed algorithm to determine which gateway BEB exports which SPB stream to the other domains. Because there is a single gateway controller—it makes all the decisions about such exporting. In a similar manner, there is no need for any kind of distributed algorithm to determine which gateway BEB is the unique entry point for each of the non-domain streams. The gateway controller makes all decisions and the gateway BEBs follows the instructions/directions received from the gateway controller. If a topology change in the SPB network requires a different gateway BEB to be selected as the entry-point for a non-domain stream, the gateway controller can make a break-old before make-new decision and eliminate the risk of transitional multicast loops. Yet another advantage is that Export/Import policies that control which streams cross domain boundaries can now be administered centrally instead of having to be provisioned individually on all the gateway BEBs.

Figure 1A:
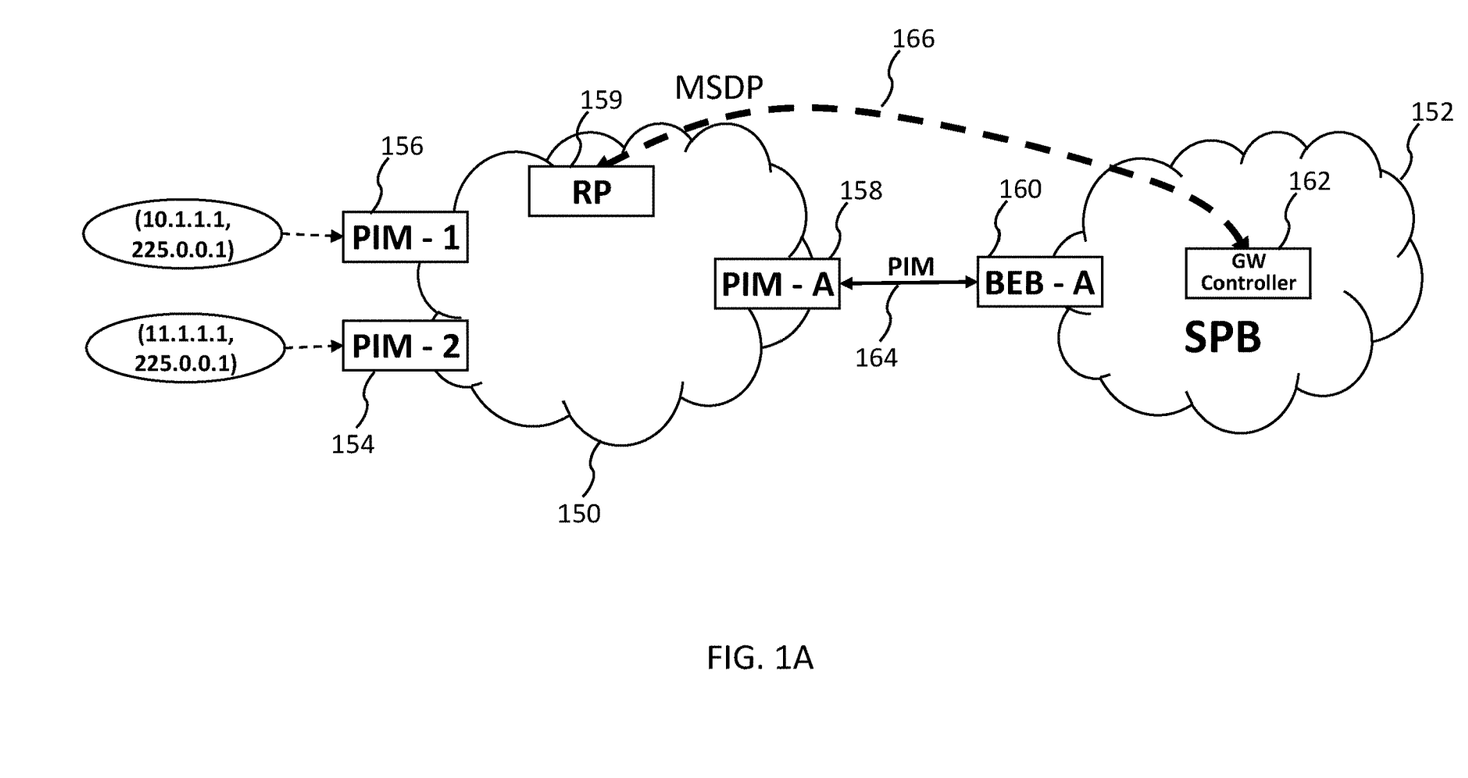
FIG. 1A comprises a block diagram of a system for providing for routing multicast data across multiple multicast routing domains connected by a shortest path bridging network in accordance with embodiments of the disclosure.

FIG. 1A comprises a block diagram of a system for providing for routing multicast data across multiple multicast routing domains connected by a shortest path bridging network in accordance with embodiments of the disclosure. One network domain 150 that carries multicast traffic is in communication with an SPB network domain 152 that forwards multicast traffic to the domain 150 as well as receives multicast traffic from the domain 150. By way of example, there are two edge devices supporting two PIM links 154, 156 that provide a respective connection to two IP networks and sources 10.1.1.1 and 11.1.1.1. The network domain 150 also has an edge device 158, PIM-A, that communicates with an edge device 160, BEB-A, of the SPB network 152. BEB-A 160 acts as a PIM gateway to the other network domain 150. In this capacity, PIM-A 158 and BEB-A 160 exchange messages 164 according to the PIM protocol. Similarly, the gateway controller 162 in the SPB network 152 and the rendezvous point 159 of the other network domain 150 are MSDP peers and exchange messages 166 according to the MSDP protocol. In FIG. 1A, only a single gateway BEB 160 is depicted and only a single other network domain 150 is depicted. One of ordinary skill will recognize that multiple gateway BEBs can be utilized and multiple network domains can be present in accordance with the principles of the present disclosure. Also, only a single gateway controller 162 is depicted; however, as explained below, additional gateway controllers can be utilized to offer redundancy in some embodiments. Other than the one (or more) gateway controller 162, no BEB of the SPB network 152 implements the MSDP protocol in order to peer with another router in the other network domain 150.

Figure 1B:
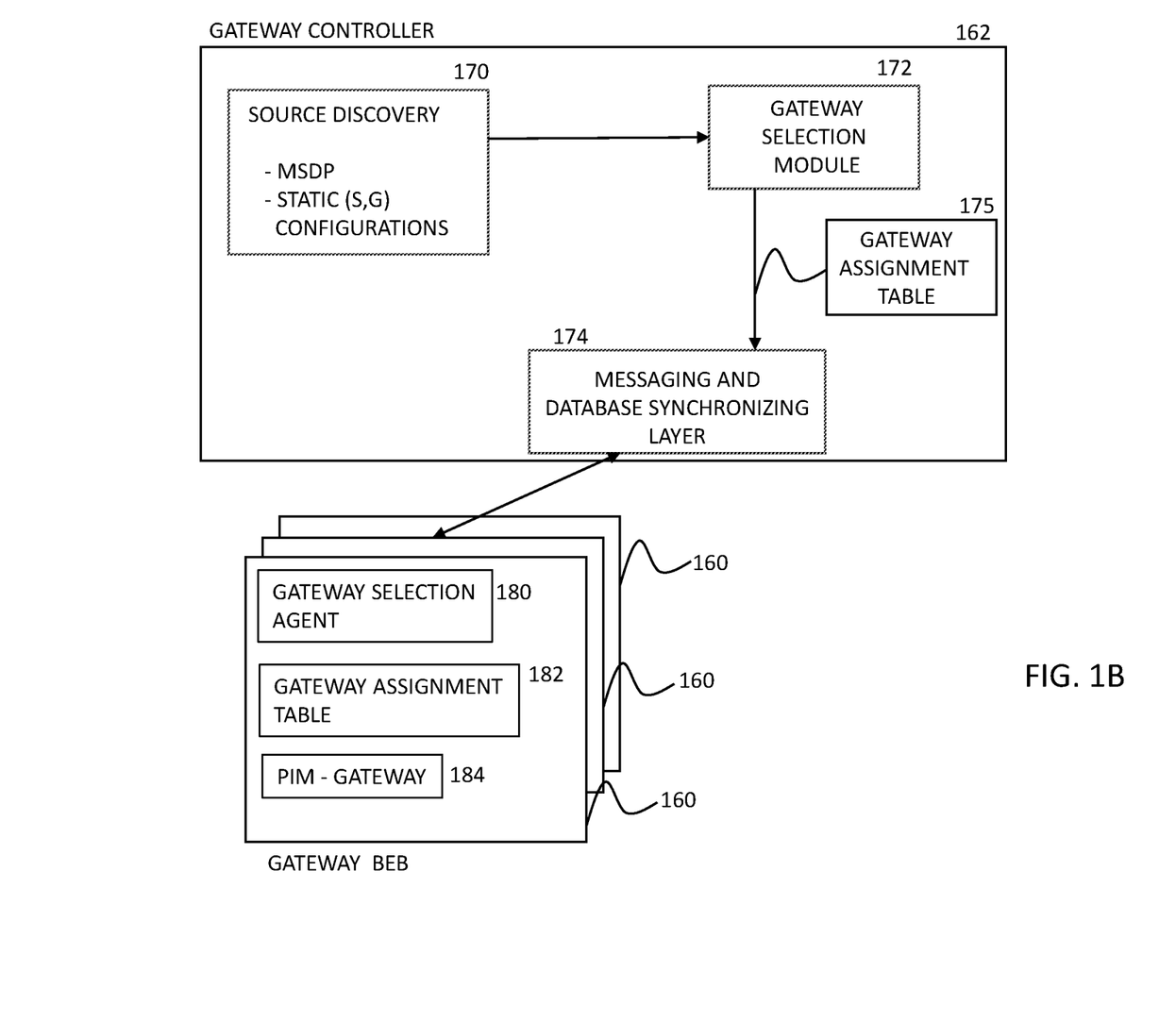
FIG. 1B comprises a conceptual block diagram of the functional elements of a gateway controller and gateway BEB in accordance with the principles of the present disclosure.

FIG. 1B comprises a conceptual block diagram of the functional elements of a gateway controller 162 and gateway BEB 160 in accordance with the principles of the present disclosure. A gateway controller 162 can include three modules, or functional blocks or elements. A source discovery module 170, a gateway selection module 172 and a messaging and database (DB) synchronizing layer 174.

The source discovery module can use MSDP exchanges with other peers to discover multicast streams that originate outside of the SPB network 152. This protocol is also used by the gateway controller 162 to export, to other network domains, information about multicast streams that originate in the SPB network 152. The gateway controller 162 can be configured with different policies that govern what information is exported as a way to constrain the respective information related to each of the multicast streams originating in the SPB network 152. An additional, or alternate, source discovery mechanism is that of static stream configuration for other multicast streams that exist outside the SPB network 152.

The gateway selection module 172 receives information from the source discovery module 170 about the non-SPB domain network streams that have been discovered and configured. Based on this information, the gateway selection module 172 determines which of a plurality of gateway BEBs should be the ingress gateway for each Inter Domain multicast stream. As one example, the BEB that has the lowest external cost to the multicast source can be selected as the gateway BEB for that source's multicast stream. Furthermore, one or more policies can be programmatically implemented by the gateway selection module 172 that define preferences for selecting a gateway BEB such as, for example, tie-breaking rules. These policies can be defined at a level to be applicable to all the Inter Domain streams or applicable to different select streams. In other embodiments each different gateway BEBs, may have its own respective policies and rules that are utilized by the gateway selection module 172. The end result is that the gateway selection module 172 generates a gateway assignment table 175 that is published via a messaging and DB synchronizing layer 174.

The messaging and database synchronizing layer 174 is depicted in FIG. 1B as residing solely on the gateway controller 162; however, this layer is essentially implemented through the cooperation of the gateway controller 162 and the one or more gateway BEBs 160. Through the exchange of messages between devices, the layer 174 supports discovery of gateway controllers and gateway BEBs as well as distribution of the gateway assignment table 175.

Any switch in the SPB network 152 can be used as the gateway controller 162 and a switch can be both a gateway BEB 160 and the gateway controller 162. Additionally, more than one switch can be configured to act as the gateway controller. to protect against a single gateway controller failure.

As mentioned above, the gateway BEB 160 also includes functionality to implement the messaging and database synchronizing layer 174 even though it is not explicitly shown in FIG. 1B. In addition to that functionality, the gateway BEB also includes a gateway selection agent 180, a copy of the gateway assignment table 182 and a PIM-gateway module 184.

The gateway selection agent 180 receives a gateway assignment table 175 published by the gateway controller 162 so that the copy of the table 182 is synchronized with the gateway controller 162. In some instances, when there is more than one gateway controller, the gateway selection agent 180 receives multiple gateway assignment tables and selects one (e.g., the most current) to use and provides that table 182 to the PIM-gateway module 184.

The PIM-gateway module 184 is responsible for managing the interfaces of the BEB-gateway for the purpose of supporting Inter Domain multicast services. One of ordinary skill will recognize that the PIM-gateway module 184 of the gateway BEB 160 supports: PIM hello messages, issuing join/leaves, processing received join/leaves, implementing the gateway assignment table 182 by acting as the ingress BEB for a stream for which it is the selected gateway BEB, enforcing the gateway assignment table 182 by not forwarding streams for which it is not the selected gateway BEB, and forwarding remote and local SPB multicast streams to satisfy the requirements from the neighboring multicast domains. FIG. 1B depicts that there may be multiple gateway BEBs 160 in communication with the gateway controller 162 and each would include the above-described functionality.

Figure 2:
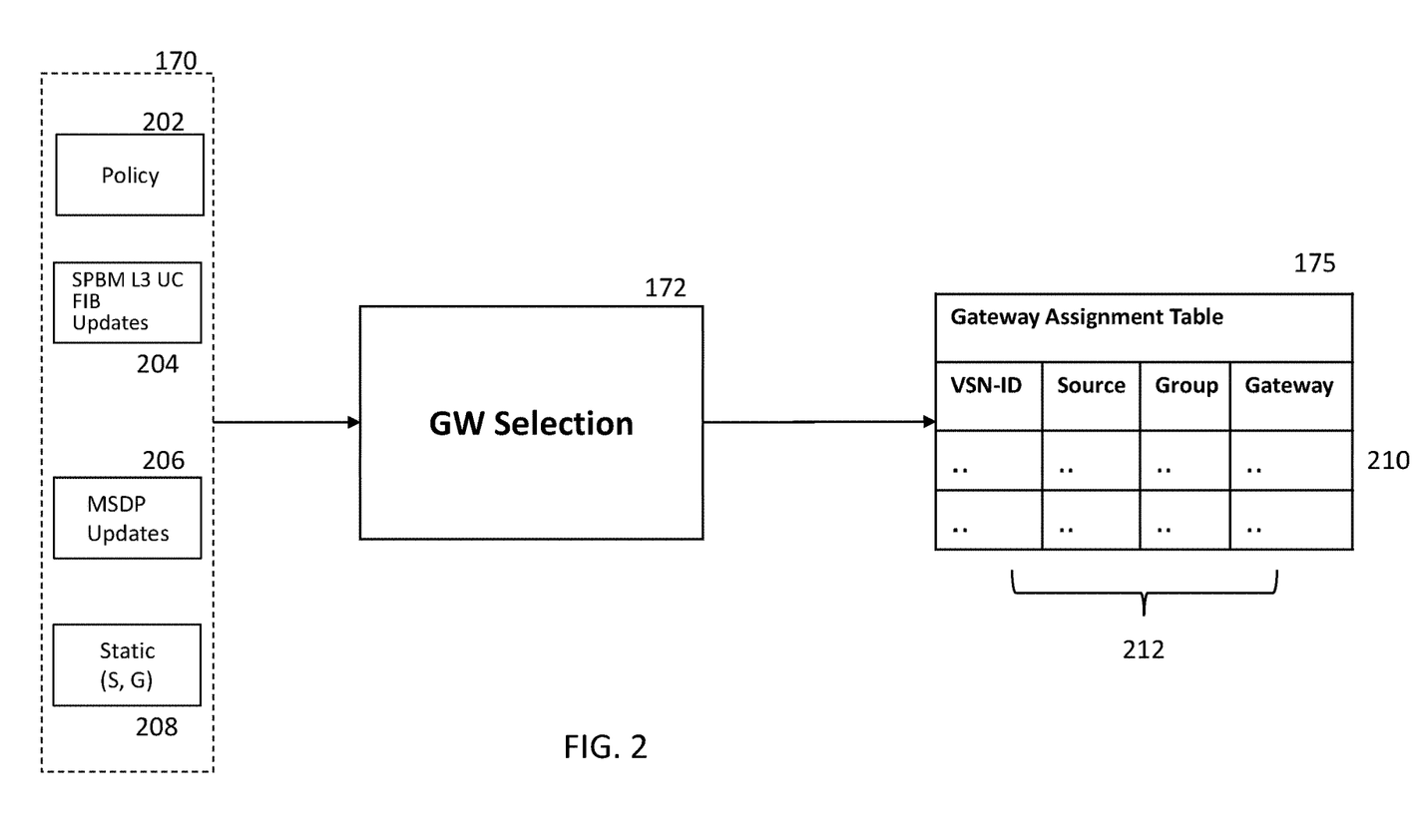
FIG. 2 depicts additional details about a gateway selection process performed by the gateway controller in accordance with the principles of the present invention.

FIG. 2 depicts additional details about the gateway selection process performed by the gateway selection module 172 of the gateway controller 162. The source discovery module 170 can rely on a number of different types of information to provide guidance to the gateway selection module 172 so that the gateway assignment table 175 can be generated. There can be administratively-defined policies 170 that are programmatically implemented to assist in shaping or engineering the multicast traffic that enters and exits the SPB network 152. The gateway controller 162 can also include unicast route information 204 such as an SPBM layer-3 unicast forwarding information base (and updates). As discussed above, the information can also include MSDP updates 206 and static multicast stream configurations 208. The gateway selection module 172, then applies appropriate decision criteria to populate the gateway assignment table 175.

As shown in FIG. 2, the gateway assignment table 175 can include a plurality of entries 210 in which each entry has respective fields 212 of information. For example, each entry 210 can correspond to one particular inter domain multicast stream amongst the plurality of inter domain multicast streams relevant to the SPB network 152. The entry 210 can include a label, or ID, that uniquely identifies the one particular multicast stream; a multicast source identifier for the particular one multicast stream; a multicast group identifier associated with the particular one multicast stream; and an identification of the BEB that is selected as the gateway BEB for the particular one multicast stream. The unique label can identify the virtual services network ID associated with the particular one multicast stream and can, for example, be a uniquely assigned I-SID within the SPB network 152. The identification of the BEB gateway field can be a MAC address or an IS-IS system ID. In either case, each gateway BEB can refer to this identification field to determine whether it corresponds to their own ID.

Figure 3A:
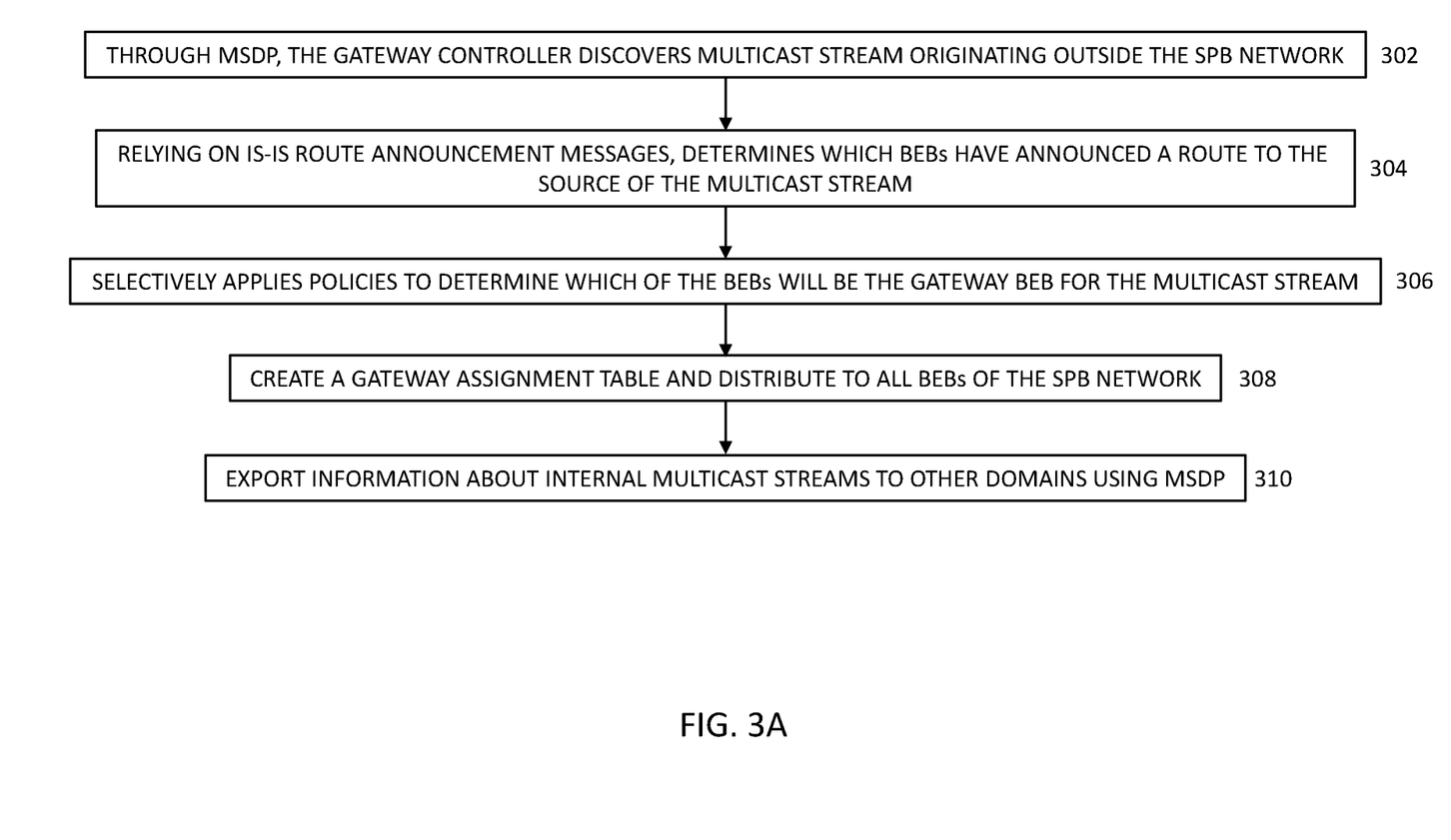
FIG. 3A is a flowchart of an example algorithm of the gateway BEB selection process in accordance with the principles of the present invention.

FIG. 3A is a flowchart of an example algorithm of the gateway BEB selection process in accordance with the principles of the present disclosure. Assuming, the gateway controller 162 has established one or more MSDP peer relationships with neighboring network domains, the gateway controller 162 discovers, in step 302, through MSDP signaling, about a multicast stream originating outside of the SPB network. Also, as mentioned above, the gateway controller 162 can accomplish source discovery by static configuration as well.

In addition to many different protocols implemented by various bridges of the SPB network, IS-IS is used in its conventional manner as a link state protocol. One type of message that is supported within the IS-IS protocol are route announcement messages. A bridge within the SPB network that has determined a route exists between itself and an IP address, for example, of a multicast source can announce that route. Because of the nature of IS-IS implementation within the SPB network, the other bridges, including the gateway controller, will receive the route announcement messages from various bridges. As such, in step 304, the gateway controller can identify a subset of BEBs that have announced a route to the source of the newly discovered multicast stream.

When only one BEB is identified, then that BEB is selected to be the gateway BEB for the new multicast stream. When more than one eligible BEB is identified, then the gateway controller, in step 306, applies policies, or tie-breaking rules, to determine which one BEB will be selected as the gateway BEB for the multicast stream. In step 308, the gateway controller creates a gateway assignment table that associates one, selected gateway BEB with each Inter Domain multicast stream. In this manner, the one BEB is the one and only ingress BEB for that multicast stream. No other BEB will forward packets of that multicast stream into the SPB network.

Thus, each BEB is responsible upon receiving an updated gateway assignment table to forward multicast traffic (either into the SPB network, or out of the SPB network) in accordance with the information in that table. The PIM-gateway module of each gateway BEB implements the gateway assignment table by acting as the ingress BEB for a stream for which it is the selected gateway BEB and enforces the gateway assignment table by not forwarding streams for which it is not the selected gateway BEB. Thus, logic within each gateway BEB compares header information of received multicast frames from external networks and based on a comparison between that header information and corresponding information within the gateway assignment table, decides whether to forward or discard each frame.

The gateway controller also controls the export of information about multicast streams originating within the SPB network. Thus, in step 310, the gateway controller relies on MSDP signaling to export that multicast stream information to other MSDP peers in other network domains.

A series of examples are described below to provide additional details about the present disclosure. These examples are not intended to limit the scope of the present disclosure but to illuminate certain features by concrete examples.

Single Gateway Use Case

In the network configuration of FIG. 1A, there is a single BEB that is available to act as a gateway BEB. Thus, only one BEB will have announced a route to the two different multicast sources 10.1.1.1 and 11.1.1.1. The table below illustrates the information available for the gateway selection module and includes the IP address of the source's network and a prefix length of how many of the 32 bits of the IP network address is a match. This information is included in the IS-IS route announcement and, therefore, is readily available.

In this instance, the unicast FIB information from BEB-A reveals that its prefix match for both networks is "24". The external route cost (i.e., the cost of the route from BEB-A to the source) is "10" for network 10.1.1.0 and is "20" for network 11.1.1.0. The MSDP cache information reveals that there are two multicast streams available and that they are the same multicast group but are from different source IP addresses. One of ordinary skill will recognize that the MSDP cache could also include entries for different multicast groups as well.

| | |
|---|---|
| SPBM IP UC FIB | 10.1.1.0/24: BEB-A external cost: 10 |
| | 11.1.1.0/24: BEB-A external cost: 20 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-A |

Based on the above information the gateway assignment table would have two multicast stream (S,G) entries that both select BEB-A as the gateway BEB for both streams. As mentioned above, the gateway assignment table can also include additional fields for each entry such as an I-SID value and a unique identifier of each gateway device such as a MAC address or an IS-IS system ID.

Dual Gateway, Long Prefix Match Use Case

Figure 3B:
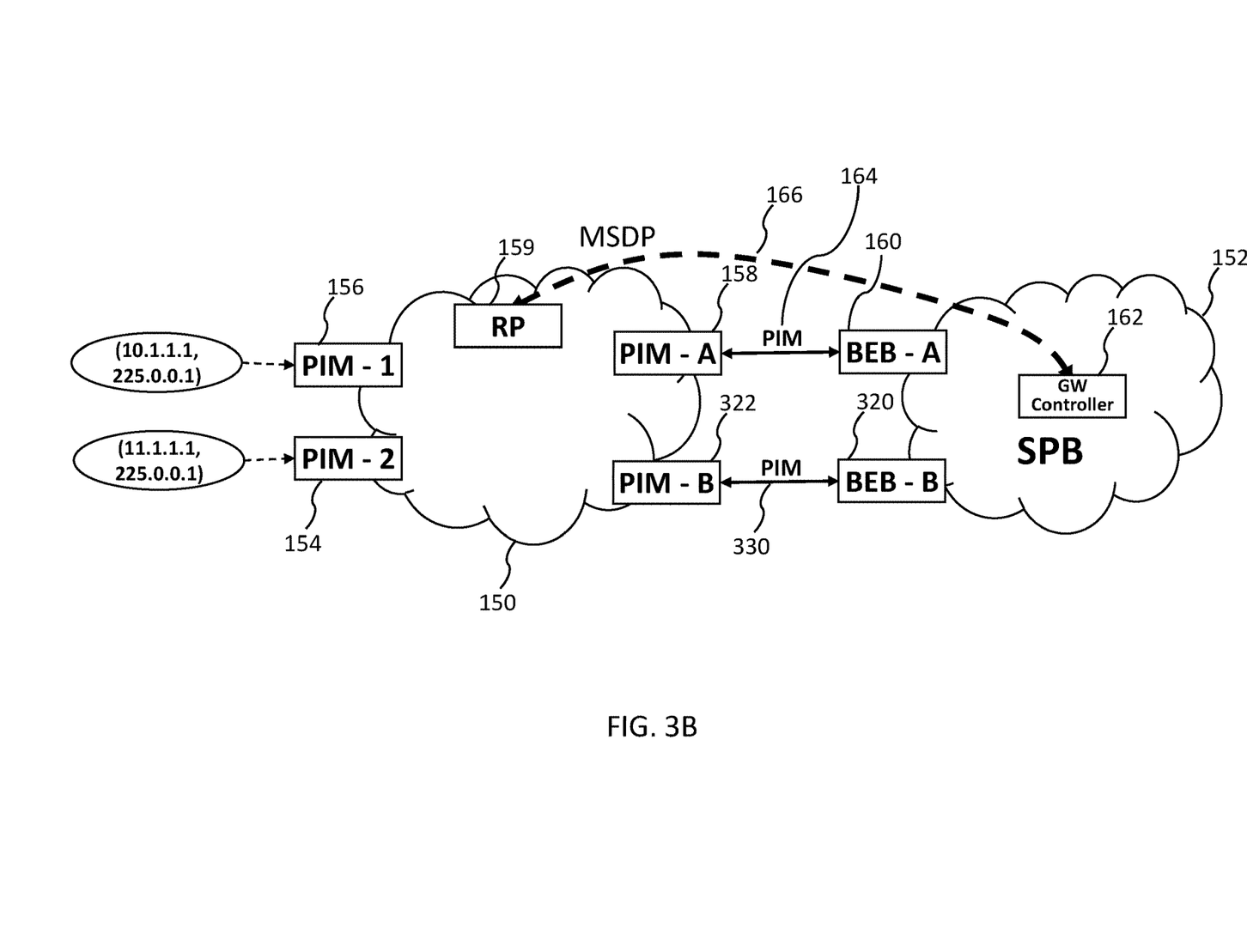
FIG. 3B and FIG. 3C are example network environments in which embodiments of the present disclosure may be implemented.

In the network configuration of FIG. 3B, there is an additional BEB 320 on the SPB network 152 and an additional edge device 322 on the other network 150. Furthermore, in addition to the PIM link 164, there is a separate PIM link 330 between the edge device 322 and the BEB-B 320. An example of available gateway selection information is provided in the table below:

| | |
|---|---|
| SPBM IP UC FIB | 10.1.1.0/24: BEB-A external cost: 10 |
| | 10.1.1.0/24: BEB-B external cost: 10 |
| | 11.1.1.0/24: BEB-B external cost: 10 |
| | 11.1.1.0/28: BEB-A external cost: 20 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-A |

Based on the above information, both BEB-B and BEB-A have made a route announcement for both networks with its accompanying cost. The external cost to network 10.1.1.0 is the same for both BEB-A and BEB-B. Similarly, the prefix match for that network address is also the same at "24" for both BEB-A and BEB-B. Thus, some other tie-breaking criteria is used for selecting the gateway BEB for the multicast stream (10.1.1.1.1, 225.0.0.1). However, for the network 11.1.1.0, BEB-B's prefix match is "24" while BEB-A's prefix match is 28. Thus, ignoring the external cost differences, the gateway controller selects BEB-A to be the gateway BEB for the multicast stream (11.1.1.1.1, 225.0.0.1).

Dual Gateway, External Cost Use Case

In a different case, still using the network configuration of FIG. 3B, an example of available gateway selection information is provided in the table below:

| | |
|---|---|
| SPBM IP UC FIB | 10.1.1.0/24: BEB-A external cost: 10 |
| | 10.1.1.0/24: BEB-B external cost: 20 |
| | 11.1.1.0/24: BEB-A external cost: 20 |
| | 11.1.1.0/24: BEB-B external cost: 10 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-B |

Based on the above information, both BEB-B and BEB-A have made a route announcement for both networks with its accompanying cost. The external costs to the different networks are different though for each BEB. In this scenario, the applied policy may be to select the BEB with the lowest external cost. Thus, the gateway assignments for the different multicast streams are selected as shown in the table.

Dual Gateway Hash Function Use Case

In a different case, still using the network configuration of FIG. 3B, an example of available gateway selection information is provided in the table below:

| | |
|---|---|
| SPBM IP UC FIB | 10.1.1.0/24: BEB-A external cost: 10 |
| | 10.1.1.0/24: BEB-B external cost: 10 |
| | 11.1.1.0/24: BEB-A external cost: 20 |
| | 11.1.1.0/24: BEB-B external cost: 20 |
| Hash Function | Hash (10.1.1.1, 225.0.0.1, BEB-A) = 13 |
| | Hash (10.1.1.1, 225.0.0.1, BEB-B) = 6 |
| | Hash (11.1.1.1, 225.0.0.1, BEB-A) = 15 |
| | Hash (11.1.1.1, 225.0.0.1, BEB-B) = 25 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-B |
| | 11.1.1.1, 225.0.0.1 > BEB-A |

Based on the above information, both BEB-B and BEB-A have made a route announcement for both networks with its accompanying cost. For both networks, the respective prefix match and the respective external cost for each BEB is the same. Thus, for a given network, neither of the previous two use case would result in a tie breaker with respect to BEB-A or BEB-B. Accordingly, another alternative policy is to create a hash function of various values using some predetermined hash algorithm. The values used in the hash algorithm can, for example, include the source IP address, the multicast group number and an IS-IS system ID of the BEB. Using these values the hypothetical results in the above table were produced. Under these circumstances the lower hash value is chosen (the higher hash value could alternatively be chosen) so that one and only one gateway BEB is selected for each multicast stream.

Gateway Link Failure Use Case

Figure 3C:
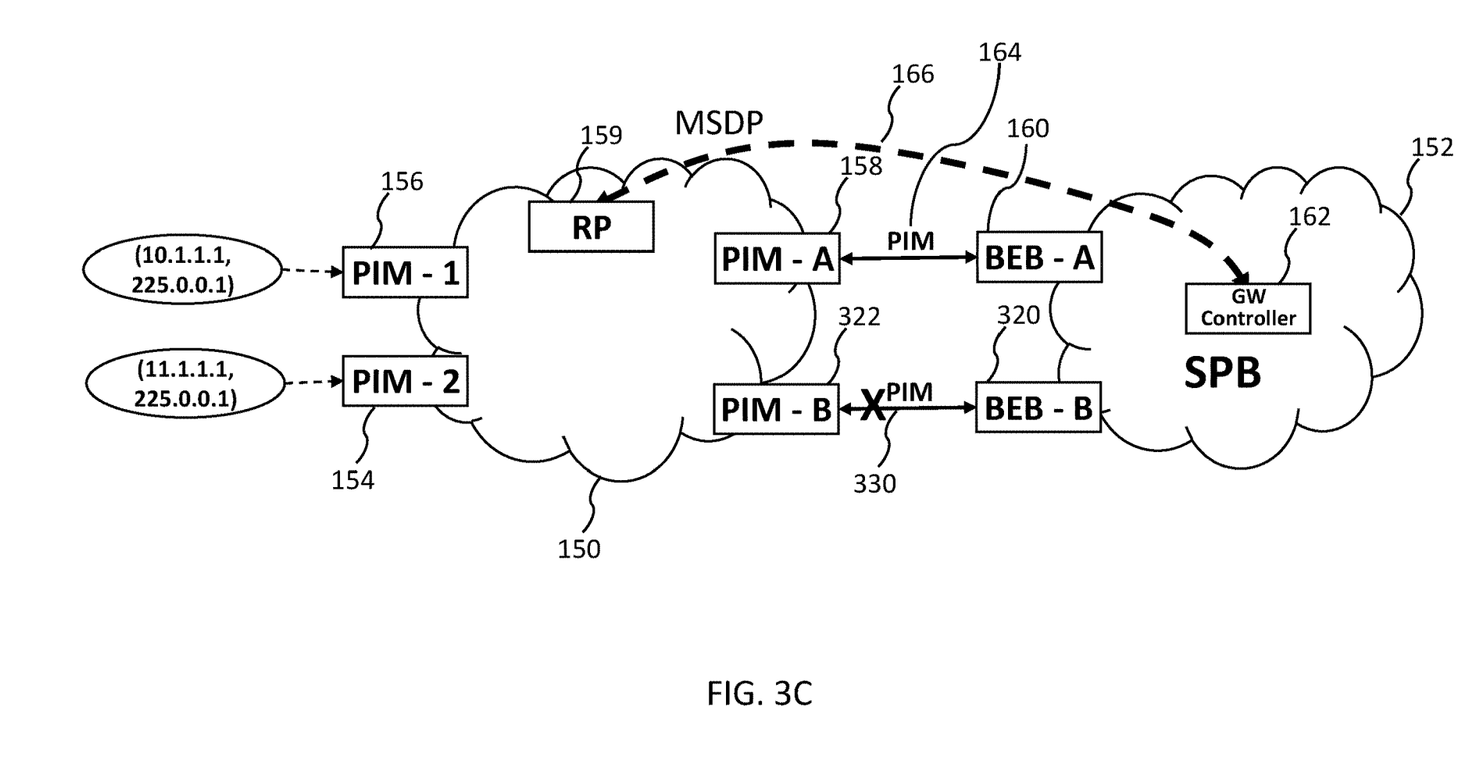

In the network configuration of FIG. 3C, a failure in the link between PIM-B 322 and BEB-B 320 occurs. BEB-B had been using PIM 330 to process multicast traffic related to the other network domain 150. With the PIM 330 link failure, BEB-B 320 is no longer available to handle that multicast traffic. Thus, there is a gateway assignment table that is in effect before the link failure and a gateway assignment table in effect after the link failure. The operation of the IS-IS link state protocol allows the failure to be detected so that the unicast FIB information can be updated. An example of available gateway selection information prior to the link failure is provided in the table below:

| | |
|---|---|
| SPBM IP UC FIB | 10.1.1.0/24: BEB-A external cost: 10 |
| | 10.1.1.0/24: BEB-B external cost: 20 |
| | 11.1.1.0/24: BEB-A external cost: 20 |
| | 11.1.1.0/24: BEB-B external cost: 10 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-B |

An example of available gateway selection information after the link failure is provided in the table below. It resembles the single gateway example described above.

| | |
|---|---|
| SPBM IP UC FIB | 10.1.1.0/24: BEB-A external cost: 10 |
| | 11.1.1.0/24: BEB-A external cost: 20 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-A |

Gateway Cost Change Use Case

Returning to the network configuration of FIG. 3B, an external cost has changed for one or more routes. Thus, there is a gateway assignment table that is in effect before the cost change and a gateway assignment table in effect after the cost change. The operation of the IS-IS link state protocol allows the cost change to be detected so that the unicast FIB information can be updated. A cost change results in a routing table change, and the routing table change is detected and announced by IS-IS. An example of available gateway selection information prior to the cost change is provided in the table below:

| | |
|---|---|
| SPBM IP UC FIB | 10.1.1.0/24: BEB-A external cost: 10 |
| | 10.1.1.0/24: BEB-B external cost: 20 |
| | 11.1.1.0/24: BEB-A external cost: 20 |
| | 11.1.1.0/24: BEB-B external cost: 10 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-B |

An example of available gateway selection information after the cost change is provided in the table below:

| | |
|---|---|
| SPBM IP UC FIB | 10.1.1.0/24: BEB-A external cost: 10 |
| | 10.1.1.0/24: BEB-B external cost: 20 |
| | 11.1.1.0/24: BEB-A external cost: 20 |
| | 11.1.1.0/24: BEB-B external cost: 30 |
| MSDP Remote Source Cache | 10.1.1.1, 225.0.0.1 |
| | 11.1.1.1, 225.0.0.1 |
| Gateway Assignment | 10.1.1.1, 225.0.0.1 > BEB-A |
| | 11.1.1.1, 225.0.0.1 > BEB-A |

In the instances that the information for generating the gateway assignment table changes and a new table has to be generated, the gateway controller can send out the new gateway assignment table immediately upon making the changes. Each BEB could also periodically poll the gateway controller, using the messaging layer, to periodically refresh their copy of the gateway assignment table.

The above example criteria ensure that as long as there is a path to a multicast stream source, a gateway that can deliver that stream to the SPB network is selected. Also, when multiple gateway BEBs are possible, the best gateway (based on predetermined policies) is determined. Using an external route metric, rather than an internal SPBM-L1 cost between the controller and the gateway as a tie breaker, removes the relative location of the gateway controller within the SPBM network from the selection criteria. Also, using the SPBM IP Unicast FIB, rather than the route table, allows the gateway BEB selection to be independent of choices made for unicast routes. In at least some embodiments, an administrator can set external route cost values as a way to control the selection of gateway BEBs and redistribute routes for sources in neighboring networks into IS-IS.

Figure 4:
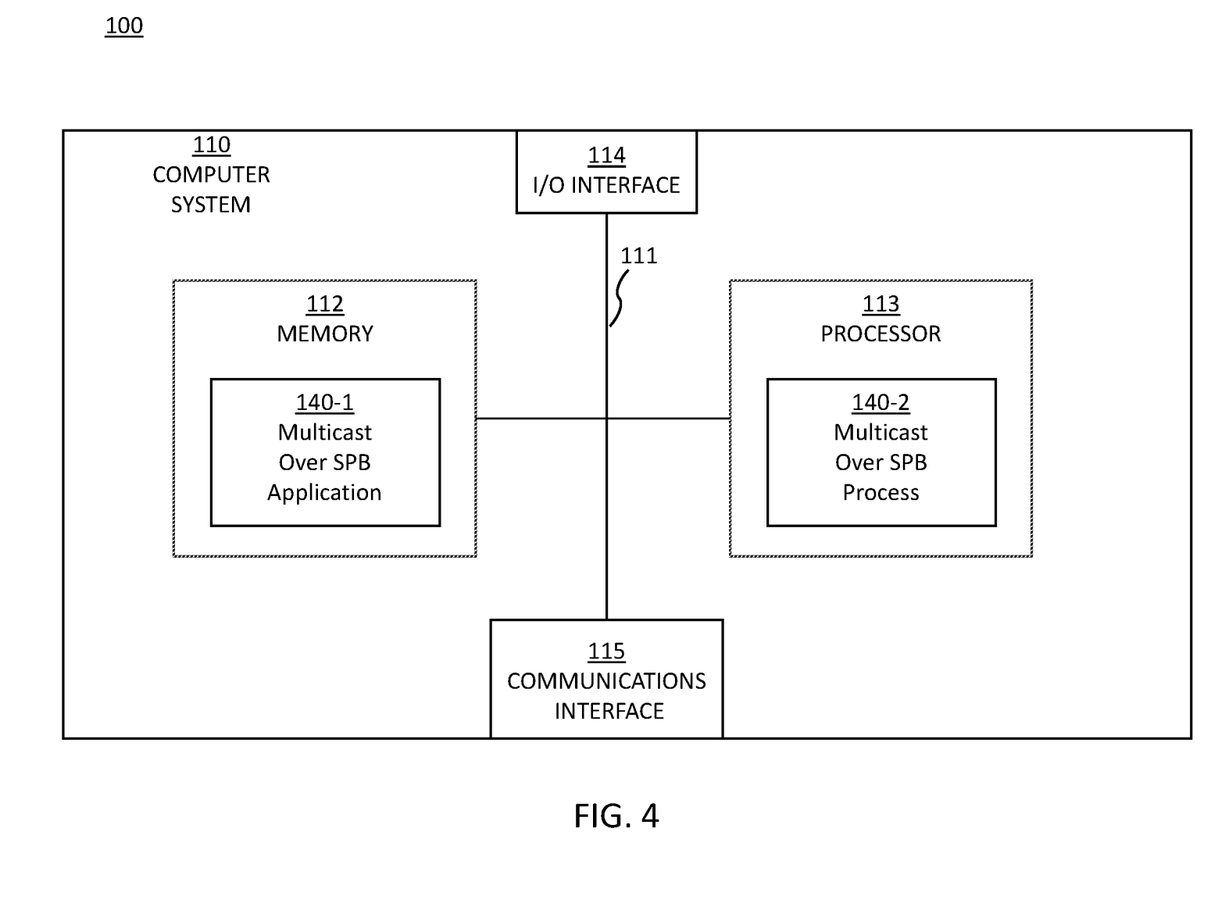
FIG. 4 illustrates an example computer platform in accordance with the principles of the present disclosure.

FIG. 4 is a block diagram illustrating example architecture of a computer system 110 that executes, runs, interprets, operates or otherwise performs a multicast over SPB operating application 140-1 and multicast over SPB operating process 140-2 suitable for use in explaining example configurations disclosed herein, such as implementing a gateway controller and/or a gateway BEB. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the multicast over SPB operating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a multicast over SPB operating application 140-1 as explained herein. The multicast over SPB operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a multicast over SPB operating application 140-1. Execution of a multicast over SPB operating application 140-1 in this manner produces processing functionality in the multicast over SPB operating process 140-2. In other words, the multicast over SPB operating process 140-2 represents one or more portions or runtime instances of a multicast over SPB operating application 140-1 (or the entire multicast over SPB operating application 140-1) performing or executing within or upon the processor 113 in the computerized device 110 at runtime.

It is noted that example configurations disclosed herein include the multicast over SPB operating application 140-1 itself (i.e., in the form of un-executed or non-performing logic instructions and/or data). The multicast over SPB operating application 140-1 may be stored on a computer readable medium (such as a floppy disk), hard disk, electronic, magnetic, optical, or other computer readable medium. A multicast over SPB operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a multicast over SPB operating application 140-1 in the processor 113 as the multicast over SPB operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the multicast over SPB application 140-1. Execution of multicast over SPB application 140-1 produces processing functionality in multicast over SPB process 140-2. In other words, the multicast over SPB process 140-2 represents one or more portions of the multicast over SPB application 140-1 (or the entire application) performing within or upon the processor 113 in the computer system 100.

It should be noted that, in addition to the multicast over SPB process 140-2, embodiments herein include the multicast over SPB application 140-1 itself (i.e., the un-executed or non-performing logic instructions and/or data). The multicast over SPB application 140-1 can be stored on a computer readable medium such as a floppy disk, hard disk, or optical medium. The multicast over SPB application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of multicast over SPB application 140-1 in processor 113 as the multicast over SPB process 140-2. Those skilled in the art will understand that the computer system 100 can include other processes and/or software and hardware components, such as an operating system that controls allocation and use of hardware resources associated with the computer system 100.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the present disclosure, it will now become apparent to those of ordinary skill in the art that other embodiments incorporating these concepts may be used. Additionally, the software included as part of the disclosure may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention described herein should not be limited to the described embodiments but rather should be limited only by the spirit and scope of the appended claims.

What is claimed is:

1. A method for a Shortest Path Bridge (SPB) network with a plurality of backbone edge bridges (BEBs), the method comprising:
  establishing, by a gateway controller of the SPB network, a Multicast Source Discovery Protocol (MSDP) link with an external network domain as a sole MSDP link with the external network domain for the SPB network;
  discovering, by the gateway controller and via the MSDP link, a source of a multicast stream originating outside of the SPB network;

determining, by the gateway controller, a subset of the plurality of BEBs configured to receive the multicast stream from the source;

selecting, by the gateway controller, a BEB from the subset of the plurality of BEBs to be a sole gateway BEB for the multicast stream; and transmitting, by the gateway controller and to each of the BEBs in the subset of the plurality of BEBs, an indication of the sole gateway BEB selected for the multicast stream.

2. The method of claim 1, wherein the sole gateway BEB and the gateway controller are separate devices in the SPB network.

3. The method of claim 1, comprising:

exporting, by the gateway controller and to the external network domain, information about one or more multicast streams originating from the SPB network.

4. The method of claim 1, wherein the subset of the plurality of BEBs comprises a first BEB and a second BEB.

5. The method of claim 4, wherein each of the first and second BEB has a respective associated external route cost to the source, and wherein selecting the sole gateway BEB comprises selecting the first BEB or the second BEB having a lower associated external route cost.

6. The method of claim 4, wherein each of the first and second BEB has a respective associated route prefix match with an IP address of the source, and wherein selecting the sole gateway BEB comprises selecting the first BEB or the second BEB having a higher route prefix match.

7. The method of claim 4, wherein a respective hash value is calculated for each of the first and second BEB based on one or more respective predetermined identifying characteristics, and wherein selecting the sole gateway BEB comprises selecting the first BEB or the second BEB having a lower associated hash value.

8. The method of claim 1, comprising:

subsequent to transmitting the indication of the sole gateway BEB selected for the multicast stream, determining a change in an attribute of a route between one of the subset of the plurality of BEBs and the source, selecting, by the gateway controller, a different one of the subset of the plurality of BEBs to be an updated sole gateway BEB for the multicast stream; and transmitting, by the gateway controller and to each of the BEBs in the subset of the plurality of BEBs, an indication of the updated sole gateway BEB selected for the multicast stream.

9. The method of claim 8, wherein the change comprises a change in an external cost of the route.

10. The method of claim 8, wherein the change comprises a link failure along the route.

11. A gateway controller in a Shortest Path Bridge (SPB) network with a plurality of backbone edge bridges (BEBs), comprising:

a memory device storing executable instructions;

a processor in communication with the memory device, wherein executing the executable instructions by the processor causes the processor to:

establish a Multicast Source Discovery Protocol (MSDP) link with an external network domain as a sole MSDP link with the external network domain for the SPB network;

discover, via the MSDP link, a source of a multicast stream originating outside of the SPB network;

determine a subset of the plurality of BEBs configured to receive the multicast stream from the source;

select a BEB from the subset of the plurality of BEBs to be a sole gateway BEB for the multicast stream; and transmit to each of the BEBs in the subset of the plurality of BEBs an indication of the sole gateway BEB selected for the multicast stream.

12. The gateway controller of claim 11, wherein the sole gateway BEB and the gateway controller are separate devices in the SPB network.

13. The gateway controller of claim 11, wherein executing the executable instructions by the processor causes the processor to:

export, to the external network domain, information about one or more multicast streams originating from the SPB network.

14. The gateway controller of claim 11, wherein the subset of the plurality of BEBs comprises a first BEB and a second BEB.

15. The gateway controller of claim 14, wherein each of the first and second BEB has a respective associated external route cost to the source; and wherein executing the executable instructions by the processor causes the processor to:

select the sole gateway BEB by selecting the first BEB or the second BEB having a lower associated external route cost.

16. The gateway controller of claim 14, wherein each of the first and second BEB has a respective associated route prefix match with an IP address of the source; and wherein executing the executable instructions by the processor causes the processor to:

select the sole gateway BEB by selecting the first BEB or the second BEB having a higher route prefix match.

17. The gateway controller of claim 14, wherein a respective hash value is calculated for each of the first and second BEB based on one or more respective predetermined identifying characteristics; and wherein executing the executable instructions by the processor causes the processor to:

select the sole gateway BEB by selecting the first BEB or the second BEB having a lower associated hash value.

18. The gateway controller of claim 11, wherein executing the executable instructions by the processor causes the processor to:

subsequent to transmitting the indication of the sole gateway BEB selected for the multicast stream, determine a change in an attribute of a route between one of the subset of the plurality of BEBs and the source;

select a different one of the subset of the plurality of BEBs to be an updated sole gateway BEB for the multicast stream; and transmit to each of the BEBs in the subset of the plurality of BEBs an indication of the updated sole gateway BEB selected for the multicast stream.

19. The gateway controller of claim 18, wherein the change comprises a change in an external cost of the route.

20. The gateway controller of claim 18, wherein the change comprises a link failure along the route.

21. The method of claim 1, wherein the transmitting further comprises:

transmitting, by the gateway controller, a gateway assignment table specifying the sole gateway BEB selected for the multicast stream to each of the subset of the plurality of BEBs.

* * * * *